United States Patent
Kao

(10) Patent No.: US 8,397,890 B2
(45) Date of Patent: Mar. 19, 2013

(54) LATCHING CLUTCH ASSEMBLY AND METHOD OF OPERATING THE SAME

(75) Inventor: Chi-Kuan Kao, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/372,878

(22) Filed: Feb. 14, 2012

(65) Prior Publication Data

US 2012/0142495 A1   Jun. 7, 2012

Related U.S. Application Data

(62) Division of application No. 12/351,901, filed on Jan. 12, 2009, now Pat. No. 8,172,058.

(51) Int. Cl.
*F16D 25/0638* (2006.01)

(52) U.S. Cl. .................. 192/85.24; 192/114 R

(58) Field of Classification Search .............. 477/166, 477/174, 107; 192/85.24, 114 R, 53.5, 84.7, 192/87.1

See application file for complete search history.

(56) References Cited

U.S. PATENT DOCUMENTS

| | | | | |
|---|---|---|---|---|
| 4,730,713 A * | 3/1988 | Pickard et al. | ............ | 192/85.44 |
| 5,031,746 A * | 7/1991 | Koivunen | .................. | 192/85.24 |
| 5,335,763 A * | 8/1994 | Katoh | ......................... | 192/85.39 |
| 5,558,195 A * | 9/1996 | Bucciero | .................... | 192/85.42 |
| 5,857,549 A * | 1/1999 | Ross | ............................. | 192/85.35 |
| 6,068,099 A * | 5/2000 | Chludek | ......................... | 192/35 |
| 6,708,808 B1* | 3/2004 | Andres | ...................... | 192/85.05 |
| 7,036,644 B2* | 5/2006 | Stevenson et al. | ............. | 192/35 |
| 2008/0314711 A1* | 12/2008 | Jayaram et al. | ............. | 192/87.1 |

* cited by examiner

*Primary Examiner* — Ha D Ho
*Assistant Examiner* — Jude Agendia
(74) *Attorney, Agent, or Firm* — Quinn Law Group, PLLC

(57) ABSTRACT

A method of operating a friction plate clutch includes activating a clutch control mechanism to engage the friction plate clutch, and engaging a holding clutch. The clutch control mechanism is then deactivated, rendering it unable to maintain engagement of the friction plate clutch. The holding clutch is used to retain engagement of the friction plate clutch. One embodiment of the method uses a wedge clutch as the holding clutch. A latching clutch assembly includes a friction plate clutch movable between an engaged and a disengaged position.

11 Claims, 4 Drawing Sheets

LATCHING CLUTCH ASSEMBLY AND METHOD OF OPERATING THE SAME

CROSS REFERENCE TO RELATED APPLICATIONS

This application is a divisional of prior application Ser. No. 12/351,901, filed Jan. 12, 2009, which is hereby incorporated by reference in its entirety.

TECHNICAL FIELD

This disclosure relates to clutch assemblies for selectively transferring rotation between two or more bodies.

BACKGROUND OF THE INVENTION

Power transmissions, particularly multi-speed power transmissions of the automatic shifting type, utilize torque transmitting members or friction devices to transfer rotational movement and torque between transmission elements. One such torque transmitting member is the friction plate clutch, which enforces frictional engagement between interleaved disc elements formed in a friction pack, and alternately coupled with an input or output member. In some cases, the friction device is a brake and the output member is a stationary housing.

Torque transmitting mechanisms include a control mechanism, such as: fluid (hydraulic), mechanical, or electrical control mechanisms. Fluid-operated torque transmitting members have a piston disposed within a housing. The piston travels linearly in a cavity in the housing between an engaged position and a disengaged position, thereby causing selective engagement of the friction elements.

SUMMARY

A method of operating a friction plate clutch is provided. The method includes activating a clutch control mechanism to engage the friction plate clutch, and engaging a holding clutch, which may be a wedge clutch. The clutch control mechanism is then deactivated, such that the clutch control mechanism is unable to maintain engagement of the friction plate clutch. The holding clutch is used to retain engagement of the friction plate clutch. The method may further include reactivating the clutch control mechanism and disengaging the holding clutch, such that control over engagement of the friction plate clutch is returned to the clutch control mechanism.

The above features and advantages and other features and advantages of the present invention are readily apparent from the following detailed description of the best modes and other embodiments for carrying out the invention when taken in connection with the accompanying drawings.

DESCRIPTION OF PREFERRED EMBODIMENTS

Figure 1:
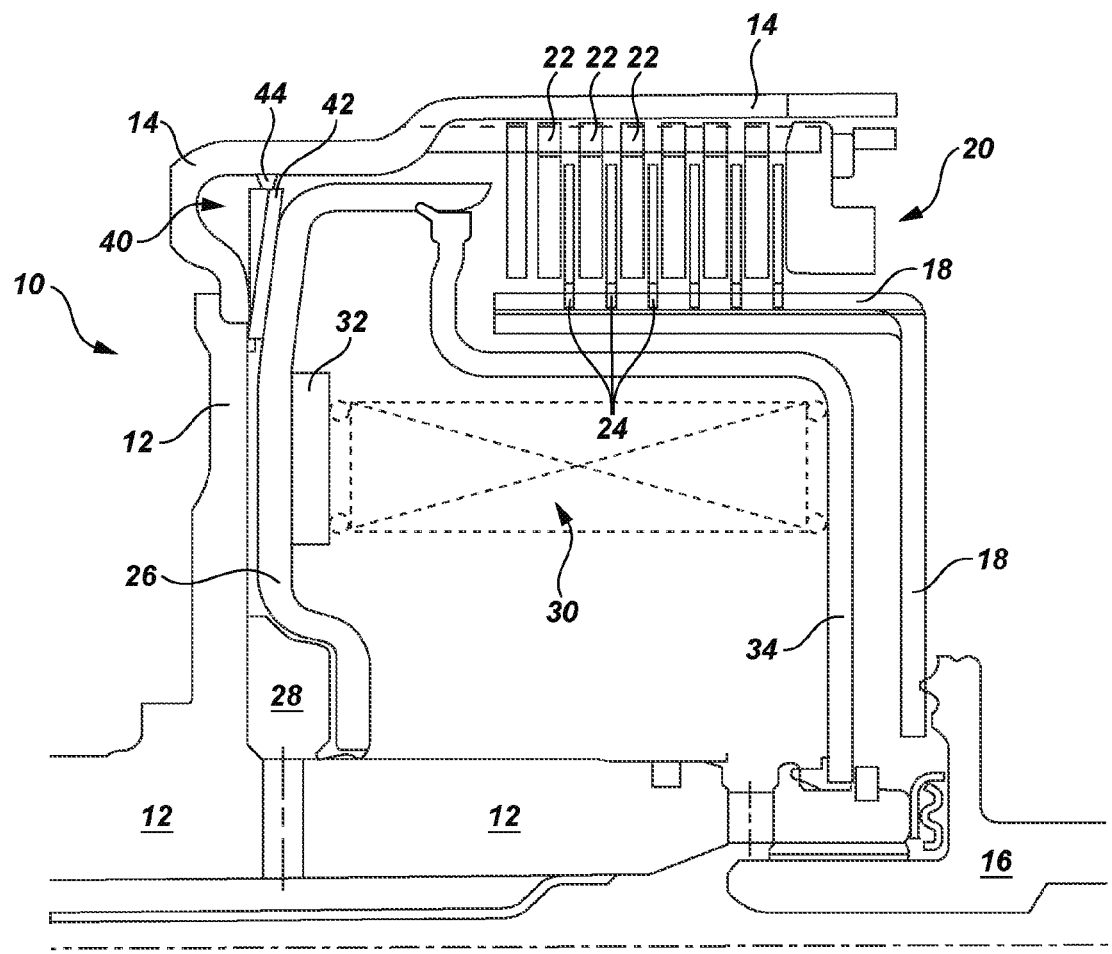
FIG. 1 is a schematic, cross-sectional view of a latching clutch assembly having a friction plate (primary) clutch and a wedge (holding) clutch, both of which are shown in a disengaged position.

Referring to the drawings, wherein like reference numbers correspond to like or similar components throughout the several figures, there is shown in FIG. 1 an embodiment of a clutch assembly 10 for selectively transferring torque between an annular first member 12, which includes an outer hub portion 14, and an annular second member 16, which includes an inner hub portion 18. The first member 12 may be an input or driving member, and the second member 16 may be an output or driven member.

Those having ordinary skill in the art will recognize that the input/output designation of the first and second members 12 and 16 is not limiting, and that the input/output nature of the two members may change during operation of clutch assembly 10. For example, in some hybrid transmission applications, the direction of rotation, and the input and output direction, may change as the operating modes of the hybrid transmission change. Furthermore, those having ordinary skill in the art will recognize that the specific orientation of the inner hub 18 and outer hub 14 are also not limiting, and that the first member 12 may have either an inner or outer hub attached thereto.

While the present invention is described in detail with respect to automotive applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims.

The embodiments shown in the figures utilize fluid (hydraulic) operated clutch control mechanisms, but other clutch control mechanisms may be used within the scope of the appended claims. For example, without limitation, the clutch control mechanism may also be: electrical, mechanical or other control methods recognizable to those having ordinary skill in the art.

A clutch pack 20 is disposed within the clutch assembly 10 between the outer and inner hubs 14 and 18. Clutch pack 20 allows selective torque transfer between the outer hub 14 and the inner hub 18—and therefore between the first member 12 and the second member 16. The clutch pack 20 incorporates a plurality of clutch plates or discs 22 and a plurality or friction plates or discs 24. The clutch plates 22 are drivingly connected with outer hub 14 and the friction plates 24 are drivingly connected with inner hub 18. The clutch pack 20, and clutch assembly 10, is shown in FIG. 1 in a disengaged position, such that the first member 12 and second member 16 may rotate at substantially different rates.

Slidably disposed in a cavity formed by the first and second members 12 and 16 and the outer and inner hubs 14 and 18, is a friction clutch piston 26. A friction clutch chamber 28 is defined between the friction clutch piston 26 and either, or both, the first member 12 and outer hub 14. Friction clutch chamber 28 is filled with a fluid, such as transmission fluid or oil, communicating with a main pressure source. The main pressure source may be, for example, without limitation: a transmission pump, a torque converter, or another pressure source recognizable to those having ordinary skill in the art. Therefore, the main pressure source feeding into the friction clutch chamber 28 acts as a hydraulic actuator for the fluid-operated clutch control mechanism.

Figure 2:
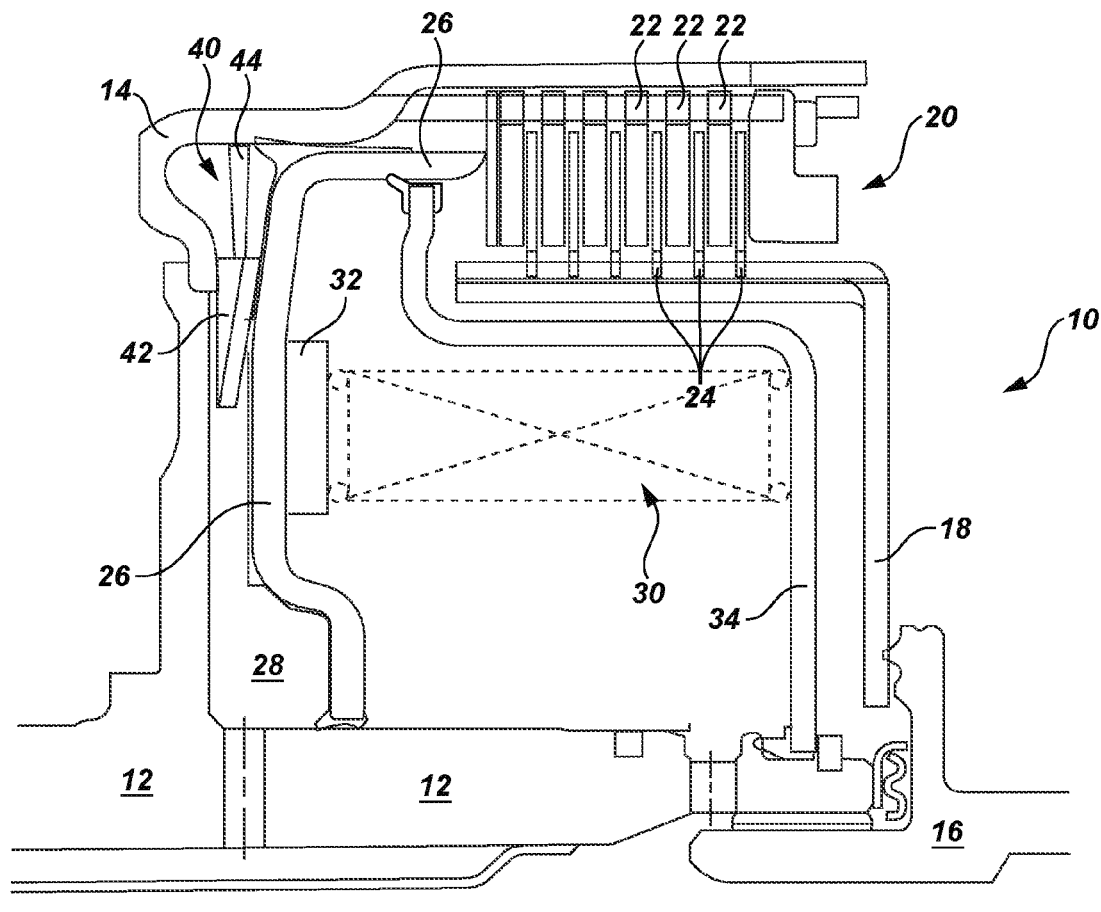
FIG. 2 is a schematic, cross-sectional view of the latching clutch assembly shown in FIG. 1, showing the friction plate clutch and the wedge clutch in respective engaged positions.

FIG. 2 shows the clutch pack 20 in the engaged position. As the pressure in the friction clutch chamber 28 is increased, the friction clutch piston 26 is biased rightward, such that it moves to the right and contacts the clutch pack 20. The force of the friction clutch piston 26 causes the clutch plates 22 to lock to the friction plates 24, resulting in substantially common rotation between the outer hub 14 and the inner hub 18, and therefore common rotation between the first member 12 and second member 16. Furthermore, the main pressure source may be throttled or otherwise controlled to selectively vary the fluid force acting on the friction clutch piston 26.

The clutch assembly 10 further includes a return spring 30. The return spring 30 acts upon a reaction plate 32, which is forced into abutment with the friction clutch piston 26. Return spring 30 also acts upon a stationary return plate 34; however, in other embodiments, the return spring 30 could act directly upon the inner hub portion 18. Thus, the friction clutch piston 26 is urged leftward, as seen in FIG. 1, by the force of the return spring 30, and opposes the rightward fluid force from friction clutch chamber 28.

When there is no longer sufficient pressure from the main pressure source to retain engagement of the clutch plates 22 to the friction plates 24, the force of the return spring 30 will move the friction clutch piston 26 leftward, causing disengagement of the clutch pack 20. Thus, the fluid-operated clutch control mechanism provides the clutch pack 20 with two positions relating to the amount of pressure in the friction clutch chamber 28 and the opposing force of the return spring 30: a pressure set position (engaged, shown in FIG. 1), and a spring set position (disengaged, shown in FIG. 2).

The availability of the main pressure source to operate the friction clutch piston 26 may be tied to the operation of the vehicle engine, such that while the engine is off (i.e, deactivated), there may be insufficient pressure to engage, or maintain engagement of, the clutch pack 20. The pressure is sufficient when the engine is on (i.e., activated). Loss of pressure may occur, for example, and without limitation, in hybrid vehicles or other vehicles which shut off (i.e, deactivate) the combustion engine during traffic stops. However, engagement of the clutch pack 20 may be desired during engine-off periods, or during engine re-starts (i.e, reactivations).

Clutch assembly 10 includes a holding clutch mechanism configured to hold or maintain engagement of clutch pack 20 without the force provided by the main pressure source in the friction clutch chamber 28. The holding clutch mechanism used in clutch assembly 10 is a wedge clutch 40, which may be selectively engaged during periods of insufficient main pressure to maintain engagement of the clutch pack 20.

The wedge clutch 40 includes a wedge 42 and a wedge actuator 44. In the embodiment shown in FIGS. 1 and 2, the wedge actuator 44 causes the wedge 42 to selectively move downward and upward (as viewed in the figures) between the first member 12 and the friction clutch piston 26. Wedge actuator 44 may be, without limitation: electrical (such as a solenoid), mechanical (such as a spring or a gear), or may be tied into the fluid-operated clutch control by manipulating fluid pressure tapped from the main pressure source.

FIG. 2 shows the wedge clutch 40 in the engaged position, such that the friction between wedge 42, first member 12, and friction clutch piston 26 will lock the wedge in place. When the wedge clutch 40 is engaged, the friction clutch piston 26 is prevented from moving leftward, and the clutch pack 20 is prevented from disengaging.

Those having ordinary skill in the art will recognize that while FIG. 2 shows both the clutch pack 20 and wedge clutch 40 in their respective engaged positions, the two need not necessarily coincide. For example, the clutch pack 20 may be engaged (as shown in FIG. 2) by the fluid-operated clutch control mechanism (the main pressure source) while the wedge clutch 40 remains in the disengaged position (as shown in FIG. 1).

By preventing leftward movement of the friction clutch piston 26, engagement of the wedge clutch 40 allows the clutch pack 20 to remain engaged even where there is no pressure in the friction clutch chamber 28. Engagement of wedge clutch 40 allows for common rotation of the first and second members 12 and 16 even when the vehicle engine is turned off and the main pressure source is not functioning.

After the fluid-operated clutch control mechanism is reactivated, and the main pressure source repressurizes the friction clutch chamber 28, the clutch pack 20 may again be held in engagement by the fluid-operated clutch control mechanism. Once the fluid force is sufficient, the friction load on the wedge 42 is decreased, and the wedge clutch 40 may be disengaged.

The wedge actuator 44 may disengage the wedge clutch 40 by moving the wedge 42 upward (as viewed in FIGS. 1 and 2). Alternatively, the wedge 42 may be pushed upward and disengaged by the fluid pressure in the friction clutch chamber 28. After disengagement of the wedge clutch 40, the fluid-operated clutch control mechanism is again allowed to completely control engagement and disengagement of the clutch pack 20.

The embodiment of the wedge clutch 40 shown in FIGS. 1 and 2 holds engagement of the clutch pack 20 by acting upon the friction clutch piston 26. However, the wedge clutch 40 may be located and configured to maintain engagement by acting on other elements of the clutch assembly 10. For example, and without limitation, the wedge clutch 40 could act directly on one of the plates 22 or 24 of clutch pack 20, thereby allowing the friction clutch piston 26 to move to its disengaged position without disengaging the clutch pack 20.

Figure 3:
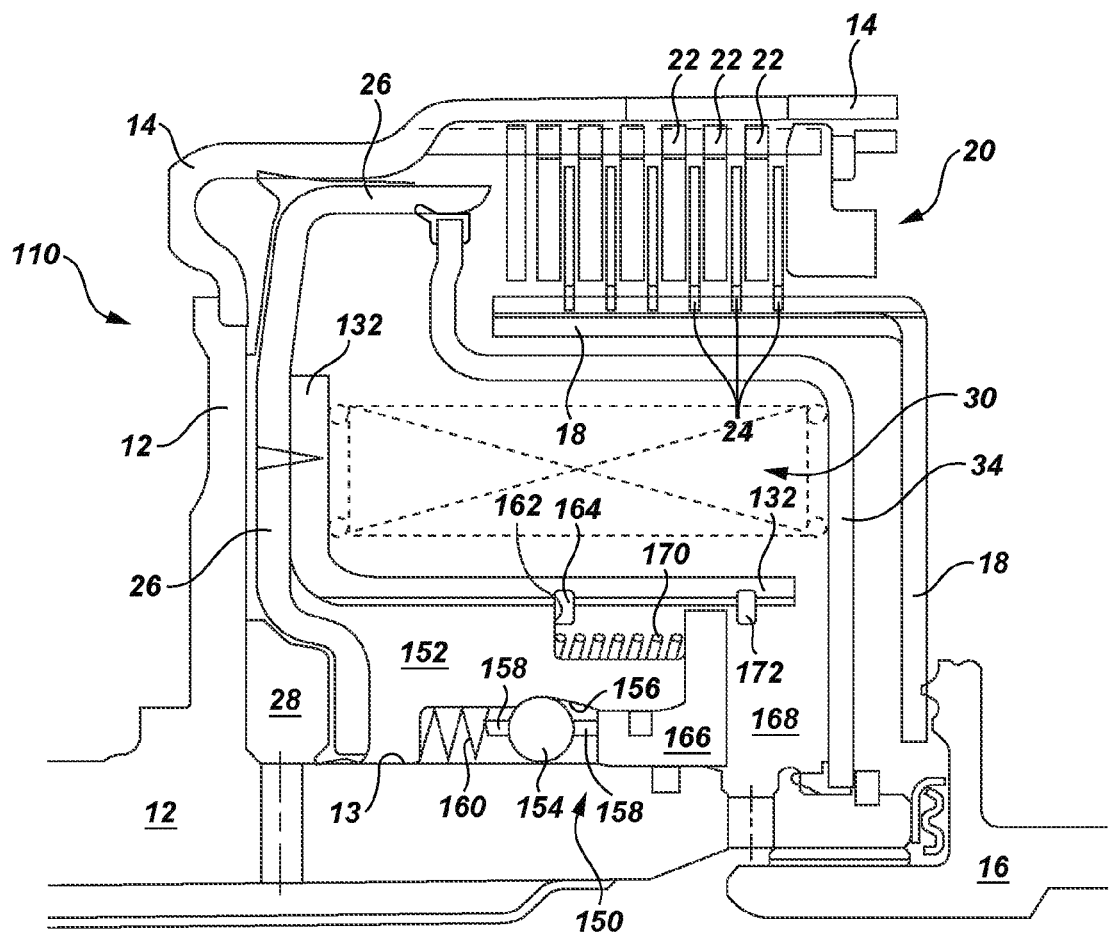
FIG. 3 is a schematic, cross-sectional view of a latching clutch assembly having a friction plate (primary) clutch shown in the disengaged position, and a bearing (holding) clutch shown in a released position.
Figure 4:
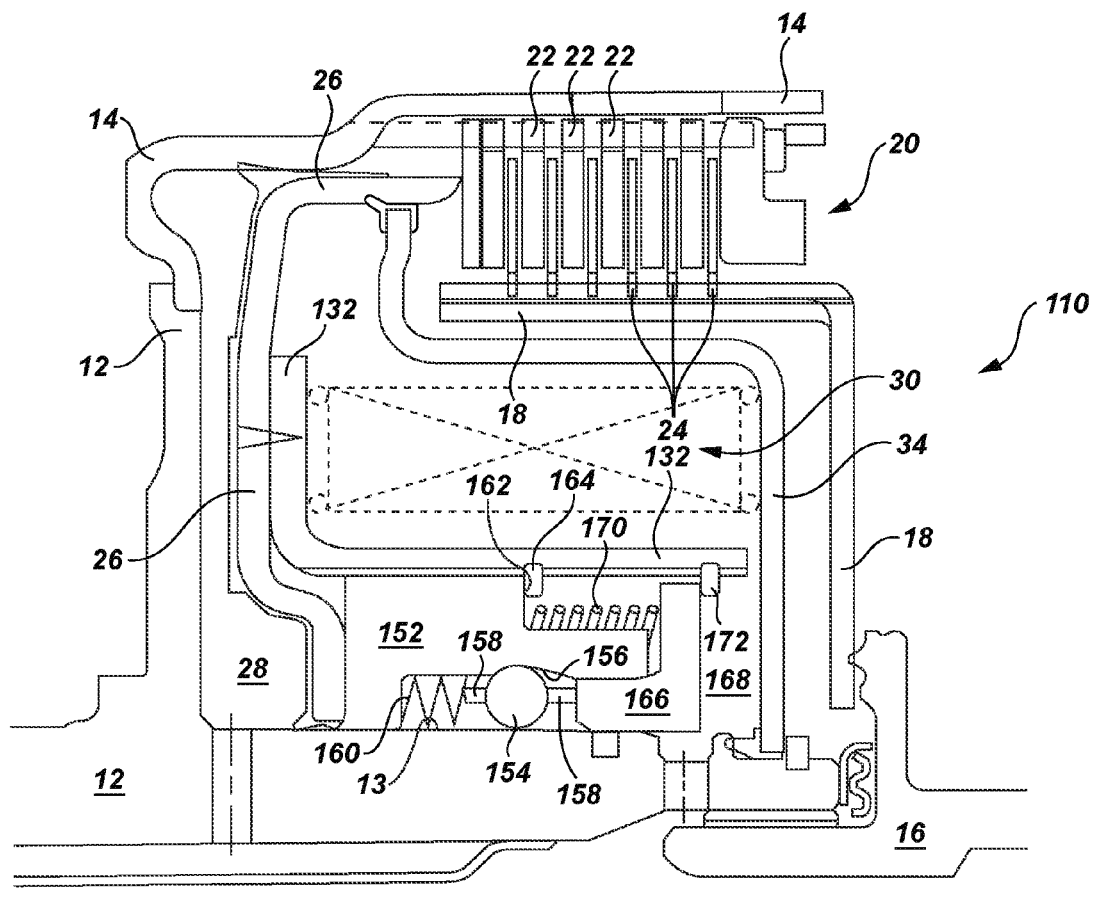
FIG. 4 is a schematic, cross-sectional view of the latching clutch assembly shown in FIG. 3, showing the friction plate clutch in the engaged position and the bearing clutch in a locked position.

Referring now to FIGS. 3 and 4, there is shown another embodiment of a clutch assembly 110 for transferring torque between first member 12 and second member 16, via the outer and inner hub portions 14 and 18. Similar to the embodiment shown in FIGS. 1 and 2, the clutch assembly 110 includes the clutch pack 20, which selectively allows torque transfer between the outer hub 14 and the inner hub 18—and therefore between the first member 12 and the second member 16.

Clutch assembly 110, and the clutch pack 20, is shown in FIG. 3 in a disengaged position, such that the first member 12 and second member 16 may rotate at substantially different rates. FIG. 4 shows the clutch pack 20 in the engaged position.

The friction clutch piston 26 is slidably disposed in a cavity formed by the first and second members 12 and 16 and the outer and inner hubs 14 and 18. The friction clutch chamber 28 is in fluid communication with the main pressure source.

In operation, to engage the clutch pack 20, as the pressure in the friction clutch chamber 28 is increased, the friction clutch piston 26 is biased rightward, such that it moves to the right and contacts the clutch pack 20. The fluid force from the friction clutch chamber 28 overcomes the force of the return spring 30 to move the friction clutch piston 26 to the right, locking the clutch plates 22 to the friction plates 24. Again, the main pressure source may be throttled or otherwise controlled to selectively vary the fluid force acting on the friction clutch piston 26.

Return spring 30 acts upon a reaction plate 132 which is fixedly attached to the friction clutch piston 26. Return spring 30 also acts upon a stationary return plate 34. The friction clutch piston 26 is urged leftward (as viewed in FIG. 3) by the force of the return spring 30, which is sufficient to overcome the opposing fluid force on the friction clutch piston 26 when the main pressure source is insufficient to retain engagement of the clutch plates 22 to the friction plates 24. Therefore, the fluid-operated clutch control mechanism again provides the clutch pack 20 with two positions: a spring set position (disengaged, shown in FIG. 3), and a pressure set position (engaged, shown in FIG. 4).

Clutch assembly 110 further includes a holding clutch mechanism configured to hold or maintain engagement of clutch pack 20 without the force provided by the main pressure source in the friction clutch chamber 28. The holding clutch mechanism used in clutch assembly 110 is a bearing clutch 150, which may be selectively locked during periods of insufficient main pressure to hold or maintain engagement of the clutch pack 20.

As explained below, the bearing clutch 150 is configured such that, when locked, bearing clutch 150 will freely move to the right but is unable to move to the left (as viewed in FIGS. 3 and 4). Therefore, the bearing clutch may also be referred to as a selective one-way mechanism.

Bearing clutch 150 includes a bearing piston 152 which is slidably disposed between the reaction plate 132 and an outer surface 13 of the input member 12. A plurality of ball bearings or spheres 154 are disposed between the outer surface 13 and a cam surface 156 formed on an inner surface of the bearing piston 152. Spheres 154 may be disposed with equiangular spacing about the outer surface 13, and the number of spheres 154 may vary, but will usually include at least three. The spheres 154 are housed in a cage 158, and are urged rightward (as viewed in FIGS. 3 and 4,) relative to the bearing piston 152, by at least one tickler spring 160, which is compressed between the bearing piston 152 and the cage 158.

The cam surface 156 is formed such that rightward movement of the bearing piston 152 allows sufficient space to permit the spheres 154 to roll freely along the outer surface 13. However, when the tickler spring 160 is able to move the spheres 154 rightward into abutment with the cam surface 156, leftward movement of the bearing piston 152 is prevented by the locking reaction between the cam surface 156, the spheres 154 and the outer surface 13. Therefore, the bearing clutch 150 will move rightward freely but will prevent leftward movement unless the tickler spring 160 is neutralized. This is the locked state of the bearing clutch 150, and is shown in FIG. 4.

A shoulder 162 is annular and aligned for contact with an annular locking ring 164 which is secured to the reaction plate 132. When the bearing clutch 150 is locked, the shoulder 162 and the annular locking ring 164 cooperate to prevent the reaction plate 132 from moving leftward. Therefore, the friction clutch piston 26 is also prevented from leftward movement. If the clutch pack 20 is in the engaged position, preventing leftward movement of the friction clutch piston 26 will prevent disengagement of the clutch pack 20, even without sufficient main pressure in the friction clutch chamber 28.

In order to disengage the clutch pack 20, the bearing clutch 150 must be released. To release the bearing clutch 150, the spheres 154 must be moved leftward, relative to the bearing piston 152, in order to relieve the spheres 154 of the locking force generated by contact with the cam surface 156.

Leftward movement of the spheres 154, relative to the bearing piston 152 and cam surface 156, is provided by a compensator piston 166, which is slidably disposed between the outer surface 13 and the reaction plate 132. In the embodiment shown, the compensator piston 166 selectively biases the cage 158, and therefore the spheres 154, leftward relative to the cam surface 156. Compensator piston 166 is in fluid communication with a compensator chamber 168, which is in fluid communication with a dam or compensator pressure source.

The compensator pressure source selectively provides fluid pressure which biases the compensator piston leftward (as viewed in FIGS. 3 and 4). A compensator return spring 170 acts to bias the compensator piston 166 rightward, opposing the fluid force from the compensator chamber 168.

If the fluid force provided by the compensator chamber 168 is sufficient to overcome the force of the compensator return spring 170, the compensator piston 166 will bias the spheres leftward, relative to the bearing piston 152, and release (disengage) the bearing clutch 150 (as shown in FIG. 3). Conversely, if the fluid force is insufficient, the compensator return spring 170 will move the compensator piston 166 rightward until it abuts an annular locking ring 172, and the tickler spring 160 will force the spheres 154 into the cam surface 156, locking (engaging) the bearing clutch 150 and restricting leftward movement of the bearing clutch 150 (as shown in FIG. 4).

When the bearing clutch 150 is released (as shown in FIG. 3), the bearing clutch 150 is free to slide along the outer surface 13 with the movement of the friction clutch piston 26 and reaction plate 132 in either direction. However, when insufficient pressure is supplied to the compensator chamber 168, the bearing clutch 150 locks (as shown in FIG. 4) and will not allow the bearing piston 152 or the friction clutch piston 26 to move leftward, and can maintain engagement of the clutch pack 20.

In operation of the clutch assembly 110, the compensator pressure source and the main pressure source may be derived from operation of the vehicle engine. If the clutch pack 20 is engaged and the engine is shut off, the loss of pressure to the friction clutch chamber 28 would cause the reaction spring 30 to attempt to disengage the clutch pack 20. However, loss of pressure to the compensator chamber 168 will lock the bearing clutch 150, such that the friction clutch piston 26 is not able to move leftward, and the engagement of the clutch pack 20 is maintained, even with little or no pressure being supplied by the main pressure source (to friction clutch chamber 28) or to the compensator pressure source (to the compensator chamber 168).

FIG. 3 shows the clutch pack 20 in the disengaged position and the bearing clutch 150 in the released position; and FIG. 4 shows the clutch pack 20 in the engaged position and the bearing clutch 150 in the locked position. However, the states of the two clutches need not always coincide in the manner shown in FIGS. 3 and 4. The bearing clutch 150 may be in either the locked or released position while the friction clutch pack 20 is in either the disengaged or engaged positions. For example, it may be desirable to place the transmission in neutral by moving the clutch pack 20 from the engaged to disengaged position while the vehicle engine is running. In such a case, the bearing clutch 150 would be placed in the released position to allow the friction clutch piston 26 to move leftward and disengage the clutch pack 20.

While the best modes and other embodiments for carrying out the claimed invention have been described in detail, those familiar with the art to which this invention relates will recognize various alternative designs and embodiments for practicing the invention within the scope of the appended claims.

The invention claimed is:
1. A method of operating a friction plate clutch, comprising:

activating a clutch control mechanism to engage the friction plate clutch;
engaging a wedge clutch;
deactivating the clutch control mechanism, such that the clutch control mechanism is unable to maintain engagement of the friction plate clutch;
retaining engagement of the friction plate clutch with the wedge clutch;
reactivating the clutch control mechanism; and
disengaging the wedge clutch wherein the wedge clutch is disengaged by fluid pressure.

2. The method of claim 1, wherein the clutch control mechanism is a hydraulic clutch control.

3. The method of claim 2, further comprising engaging and disengaging the wedge clutch with the clutch control mechanism.

4. The method of claim 3, further comprising:
deactivating a vehicle engine after engaging the wedge clutch; and
reactivating the vehicle engine before reactivating the clutch control mechanism.

5. A latching clutch assembly, comprising:
a friction plate clutch movable between an engaged position and a disengaged position; and
a wedge clutch operatively coupled to said friction plate clutch and movable between an engaged position and a disengaged position, wherein the wedge clutch is disengaged by fluid pressure, and wherein said engaged position of said wedge clutch is configured to oppose movement of said friction plate clutch from said engaged position to said disengaged position.

6. The latching clutch of claim 5, further comprising:
a first pressure source in fluid communication with said friction plate clutch, wherein said friction plate clutch is biased toward said engaged position by said first pressure source; and
an actuator operatively connected to said wedge clutch, wherein said actuator is configured to move said wedge clutch between said disengaged position and said engaged position.

7. The latching clutch of claim 6, further comprising:
a clutch hub; and
a clutch piston, wherein said wedge clutch is configured to be disposed between said clutch housing and said clutch piston when said wedge clutch is in said engaged position.

8. The latching clutch of claim 7, wherein said actuator is in fluid communication with said first pressure source, and said first pressure source is configured to move said wedge clutch between said disengaged position and said engaged position.

9. A method of operating a friction plate clutch, comprising:
activating a clutch control mechanism to engage the friction plate clutch;
engaging a wedge clutch, wherein the wedge clutch includes a moveable wedge;
deactivating the clutch control mechanism, such that the clutch control mechanism is unable to maintain engagement of the friction plate clutch;
retaining engagement of the friction plate clutch with the wedge clutch;
reactivating the clutch control mechanism; and
disengaging the wedge clutch wherein the wedge clutch is disengaged by fluid pressure.

10. The method of claim 9, wherein the clutch control mechanism is a hydraulic clutch control.

11. The method of claim 10, further comprising:
deactivating a vehicle engine after engaging the wedge clutch; and
reactivating the vehicle engine before reactivating the clutch control mechanism.

* * * * *